Nov. 26, 1935.  O. H. FOWLER  2,022,032
BRAKE
Filed April 29, 1931
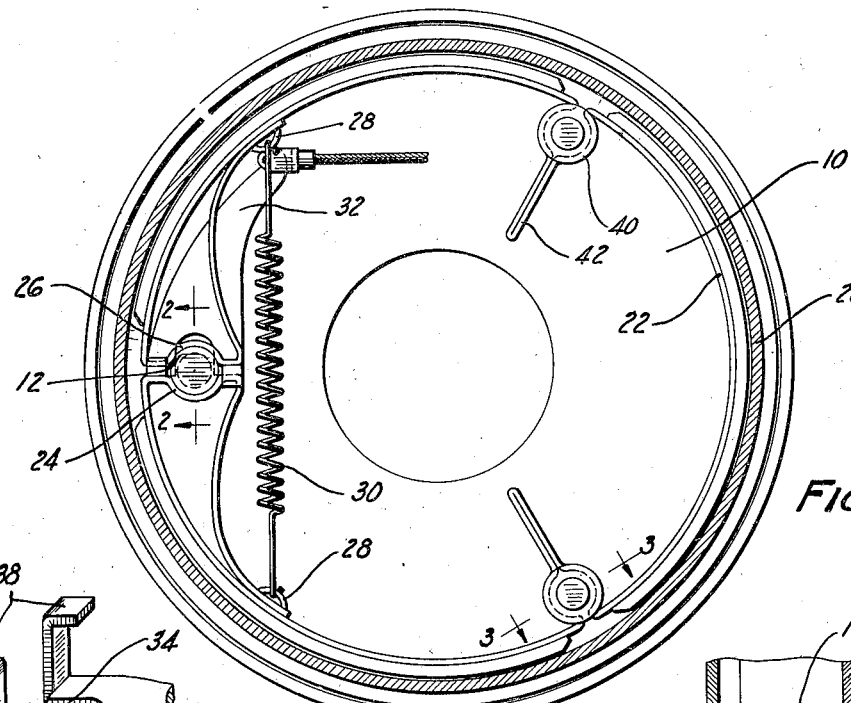
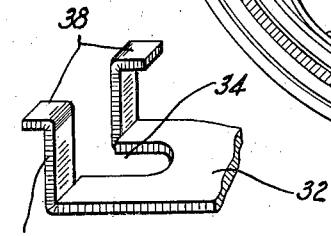
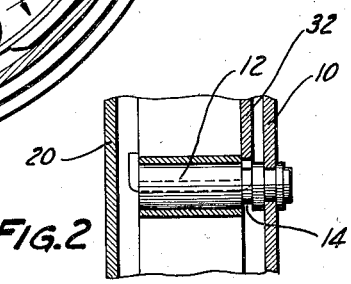
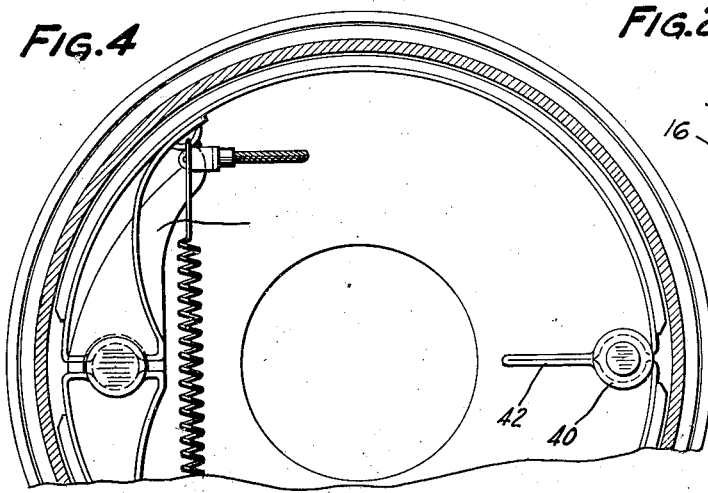
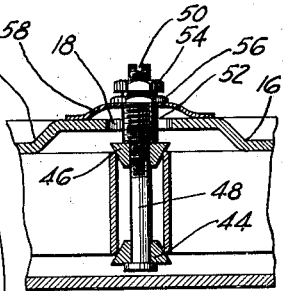
INVENTOR.

Patented Nov. 26, 1935

2,022,032

UNITED STATES PATENT OFFICE 2,022,032

BRAKE

Owen H. Fowler, South Bend, Ind., assignor to Bendix Brake Company, South Bend, Ind., a corporation of Illinois Application April 29, 1931, Serial No. 533,738

14 Claims. (Cl. 188—78)

This invention relates to brakes and more particularly to internal expanding brakes.

Broadly, the invention comprehends a split band deformed to provide a sectionalized friction element having separable ends and spaced loops for the reception of suitable adjustable steady rests.

In the illustrated embodiment a split band is shown deformed to provide rigid shoulders on the separable ends of the band and spaced expansible loops or sleeves adaptable for the reception of expansible devices, which provide for adjustment of the over-all length of the band to compensate for wear, and in addition thereto serve as steady rests for the band.

An important object of the invention is the deformation of a single band to provide a sectionalized friction element. Another important object of the invention is the provision of an expansible steady rest.

Another object of the invention is to provide a friction element comprising a single band having flexible sleeves and means positioned in the sleeves for adjusting the length of the band together with means supporting the band.

Yet a further object of the invention is to provide a floating operating member for a friction element including means for retaining the friction element against lateral movement.

An important feature of the invention is a sectionalized friction element comprising a single band deformed to provide a plurality of arcuate sections.

Another feature of the invention is a friction element comprising a single band having spaced loops for the reception of expansible steady rests.

Yet another feature of the invention is a floating actuating cam for the friction element including means for retaining the friction element against lateral movement.

Other objects and features of the invention will appear from the following description taken in connection with the drawing, which forms a part of this specification, and in which:

Figure 1 is a vertical sectional view of a brake illustrating the friction element in side elevation and showing the invention as applied;

Figure 2 is a sectional view substantially on line 2—2, Figure 1;

Figure 3 is a sectional view substantially on line 3—3, Figure 1;

Figure 4 is a perspective view of the floating operating lever, and;

Figure 5 is a vertical sectional view of a brake partly broken away illustrating a modification of the invention.

Referring to the drawing for more specific details of the invention, 10 represents a fixed support such as a backing plate which may be secured to an axle or to a steering knuckle. Positioned on the backing plate is an anchor 12 having a circumferential slot 14. The backing plate has spaced swedged portions 16 and transverse openings 18 intermediate the swedged portions, and associated with the backing plate is a rotatable drum 20, which may be secured to a wheel, not shown.

Positioned for movement on the backing plate is a friction element adaptable for cooperation with the drum. The friction element comprises a single split band 22 having its separable ends deformed to provide suitable shoulders 24 and 26 adaptable for engagement with the anchor 12. The shoulders are formed by bending the ends of the band substantially radially and then back upon the band to provide trusses; and spot-welding or otherwise securing the ends to the body of the band. The extreme ends of the band are stamped to provide loops or hooks 28 for attaching a return spring 30. This spring serves to retain the band, when in the off position, in proper spaced relation with the braking surface of the drum.

Positioned on the anchor is a floating operating lever 32. This lever is slotted as indicated at 34 to embrace the anchor. The wall defining the slot engages the circumferential groove in the anchor. Suitable cams 36 are formed upon the lever. These cams are provided with lateral portions 38 extending in opposite directions over the separable or shouldered ends of the band, so that lateral displacement of the separable ends of the band may be avoided.

As shown, the band is deformed to provide arcuate sections of substantially the same length. These sections are surfaced with a suitable friction lining and intermediate the sections the band is deformed to provide split sleeves 40 having radially extending loops 42. Positioned in the respective ends of the sleeves 40 are conical members 44 and 46. These members are axially bored to receive bolts 48 having diametral slots 50 in their ends, and threaded on the bolts are elongated nuts 52 extending through the opening 18 in the backing plate. The elongated nuts 52 are provided with heads 54, and are externally threaded to receive thin nuts 56. Positioned on the elongated nuts beneath the nuts 56 are plate springs 58, having their ends engaging the backing plate.

A modification of the invention is illustrated in Figure 5. In this modification the band is formed in two corresponding sections, each provided with a suitable friction lining. The sections are connected by a loop in which is positioned a combined steady rest and adjusting device diametrally disposed with respect to the separable ends of the band. From this modification it will be readily understood that the invention is adaptable for a friction element having two or more friction surfaces.

The interlocking of the floating operating lever with the anchor and with the friction element prevents lateral displacement of the friction element and yet the operating member is free to float with the friction element in either forward or reverse braking.

The flexible integral connection, including the sleeve 40 and loops 42 between the sections of the friction element or band are of such structure that expansion thereof causes the band to extend circumferentially, since upon expansion of the sleeve 40 the bending stress is at the extreme inner end of the loops 42 extending radially from the sleeve.

The expansible means imposes a uniform expanding force on the band so that the band may be radially adjusted to compensate for wear, and in addition thereto, the expansible means provides a very satisfactory steady rest for the friction element permitting movement of the element in either direction of braking. It also provides means for increasing the tension on the steady rest. This may be accomplished by tightening up the nut 56 to compress the spring 58.

Although this invention has been described in connection with certain specific embodiments, the principles involved are susceptible of numerous other applications that will readily occur to persons skilled in the art. The invention is therefore, to be limited only as indicated by the scope of the appended claims.

Having thus described the various features of the invention, what I claim as new and desire to secure by Letters Patent is:

1. A floating friction element including a split band having separable ends and having between its ends a resilient sleeve expansible to adjust the effective length of the band, and having sleeve-expanding means mounted in the sleeve and floating with the band.

2. A friction element comprising a single split band deformed to provide shoulders on its separable ends and spaced sleeves having radial loops.

3. A frictional element comprising a sectionalized band having a sleeve having a radial resilient loop and formed integral with the band between the sections.

4. A friction element comprising a sectionalized band having split sleeves with radial loops formed integral with the band between the sections.

5. A friction element comprising a sectionalized band having sleeves integral with the sections and an expansible device in the sleeves.

6. A friction element comprising a sectionalized band having sleeves between the sections formed integral with the band and provided with loops and expansible devices in the sleeves.

7. A friction element comprising a sectionalized band having split sleeves connecting the sections, provided with radial loops, and expansible means in the sleeves.

8. A brake comprising a fixed support, a sectionalized friction element on the support, sleeves connecting the sections, expansible devices in the sleeves and a tension member between the expansible member and the fixed support.

9. A brake comprising a fixed support, a sectionalized friction element on the support, a split sleeve between the sections formed integral with the element, a floating expansible device in the sleeve, and yielding means between the expansible device and fixed support and permitting shifting of said device but holding the friction element yieldingly against the support.

10. A brake comprising a floating operating member having lobes arranged in the same plane and lugs on the lobes extending in opposite directions.

11. A brake comprising a sectionalized friction element having flexible portions connecting the sections and shiftable means for yieldingly supporting the friction element including means for expanding the flexible portions.

12. A brake comprising a fixed support, a friction element on the support including a sectionalized band having a flexible portion and means for expanding the flexible portion including an operating portion extending through the support in a manner permitting it to shift with respect thereto, and a tensioned plate spring carried by said portion and slidably engaging the support.

13. A brake comprising a fixed support, a friction element, an anchor on the support, and a floating operating lever having laterally-projecting lugs with end portions paralleling the body of the lever and interlocking with the friction element and having a cut-out portion between said lugs embracing the anchor.

14. A brake-applying lever having laterally-projecting lugs with end portions paralleling the body of the lever and having a cut-out anchor-embracing portion between said lugs.

OWEN H. FOWLER.